Dec. 1, 1959 C. L. WANLASS ET AL 2,915,597

MAGNETIC HEAD

Filed July 17, 1957

INVENTORS.
CRAVENS L. WANLASS
SYLVAN D. WANLASS

BY THEIR ATTORNEYS.
HARRIS, KIECH, FOSTER & HARRIS

United States Patent Office 2,915,597 Patented Dec. 1, 1959

2,915,597

MAGNETIC HEAD

Cravens L. Wanlass, Whittier, and Sylvan D. Wanlass, Granada Hills, Calif., assignors, by mesne assignments, to Ford Motor Company, Dearborn, Mich., a corporation of Delaware Application July 17, 1957, Serial No. 672,446

14 Claims. (Cl. 179—100.2)

Figure 1:
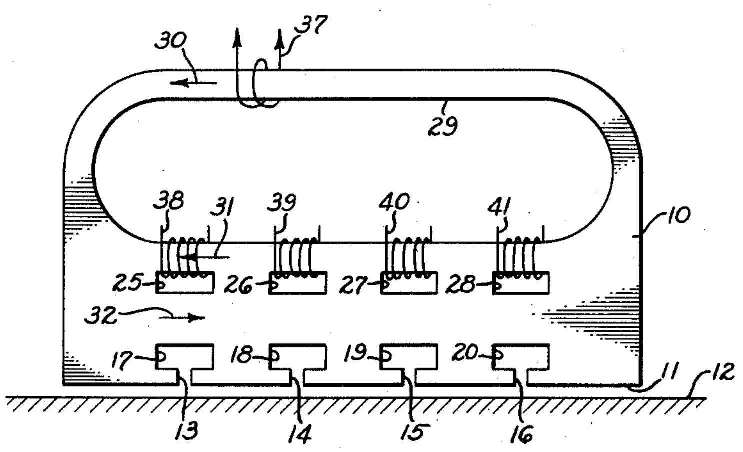

This invention relates to a magnetic head for magnetic reading and writing, i.e., transferring information to and from a magnetic surface such as a drum, tape or the like. The invention is particularly concerned with a magnetic head for reading and writing on one or more of a plurality of channels or tracks on the magnetic surface without requiring mechanical movement of the head. The magnetic head of the invention is equally suitable for reading and writing, since one operation is the reverse of the other. Hence, while the following specification and claims refer to a writing head, it is understood that the specification and claims are equally applicable to a reading head, with the exception that only one track per read circuit may be read at any given time.

When it is desired to write on a plurality of channels of a magnetic surface with a single-channel head, the head must be moved from one location to another, in alignment with each of the channels on the surface. The physical movement of the head requires a finite time interval thereby preventing substantially instantaneous switching of channels. Furthermore, the head must be precisely positioned since the magnetic channels are narrow and closely spaced, requiring accurate servo systems for driving the head.

It is an object of this invention to provide a magnetic head for writing on one or more of a plurality of channels without requiring physical movement of the head, thereby eliminating lost time due to physical movement and eliminating driving equipment.

It is another object of the invention to provide a magnetic head in which the writing channel or channels are energized by low current selection windings which may be powered directly from diode gating circuits without requiring current amplification. A further object of the invention is to provide a magnetic head for writing on one or more of a plurality of channels with a writing winding or windings which are driven directly from a write circuit output without channel switching. Another object of the invention is to provide such a magnetic head for writing on a plurality of channels while having only a single write winding. A further object of the invention is to provide an alternative form for such a magnetic head having a plurality of write windings connected in series for energization from a single output.

It is another object of the invention to provide a magnetic head for writing on one or more of a plurality of channels on a magnetic surface which head includes a structure of magnetic material providing a plurality of air gaps and means defining a first magnetic path adjacent to each of the air gaps and means defining a second magnetic path spaced from the first magnetic path with the first and second paths disposed in parallel and with corresponding ends thereof connected across a third magnetic path and with a plurality of windings positioned about each of the second and third paths respectively. A further object of the invention is to provide such a magnetic head in which the cross sectional area of the third path is less than the sum of the cross sectional areas of the first and second paths, and the cross sectional area of the first path is greater than that of the second path but less than the sum of the cross sectional areas of the second and third paths.

It is a further object of the invention to provide a magnetic head for writing on one or more of a plurality of channels which can utilize low current selection windings having a relatively large number of turns and a high current write winding or windings with relatively few turns providing relatively slow switching or channel selection but relatively fast writing.

The invention also comprises novel details of construction and novel combinations and arrangements of parts, which will more fully appear in the course of the following description. The drawing merely shows and the description merely describes preferred embodiments of the present invention which are given by way of illustration or example.

Figure 2:
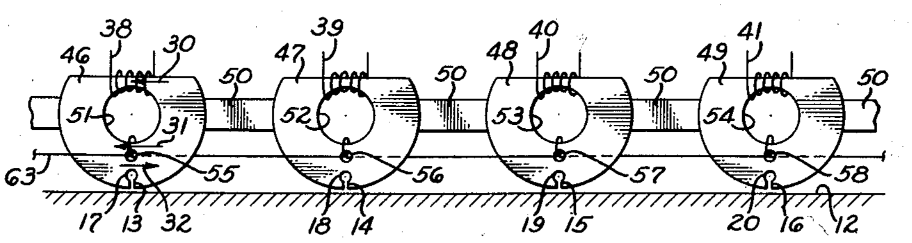

In the drawing:

Fig. 1 is a diagrammatic representation of a preferred embodiment of the invention; and Fig. 2 is a similar representation of an alternative embodiment of the invention.

The magnetic head of the invention as shown in Fig. 1, includes a magnetic structure which may be a single block 10 of magnetic material having a plurality of openings therein. The block 10 is positioned with an edge 11 adjacent a magnetic surface 12 which may be the surface of a magnetic recording drum or of a magnetic recording tape or the like. A plurality of relatively narrow air gaps 13, 14, 15, 16 are provided in the edge 11 and relatively large air gap openings 17, 18, 19, 20 are provided in the block 10 connecting with the corresponding air gaps to produce a relatively low reluctance across each of the air gaps adjacent the magnetic surface 12 and a relatively large reluctance across each of the air gap openings.

A corresponding plurality of channel selection openings 25, 26, 27, 28 and a single write or signal opening 29 are also provided in the block 10, the channel selection openings being positioned between the write opening and the air gap openings to provide a first magnetic path indiacted by the arrow 30, a second magnetic path indicated by the arrow 31 and a third magnetic path indicated by the arrow 32.

A write or signal winding 37 is passed through the write opening 29 and encircles a portion of the block so as to create a magnetic flux in the first magnetic path. A plurality of channel selection windings 38, 39, 40, 41 are passed through the write opening 29 and the corresponding channel selection openings 25, 26, 27, 28 and encircle corresponding portions of the second magnetic path in order to produce a magnetic flux in such portion. While not necessary to the operation of the magnetic head of the invention, it is preferred in the construction thereof to make all of the air gaps the same size, all of the air gap openings the same size, all of the channel selection openings the same size, all of the channel selection windings the same size and to symmetrically position the corresponding elements, such as shown in Fig. 1, so that each of the channels may be actuated by a current of the same magnitude and, also for simplifying design and construction.

The magnetic head of Fig. 1 may be used for writing on the magnetic surface 12 by operating it as follows. First, a channel selection current is applied to one or more of the channel selection windings, the particular winding energized determining the particular portion or channel of the surface 12 to be written upon. Suppose the writing is to occur at the air gap 13. Then a current is applied to winding 38 of sufficient magnitude to saturate that portion of the second magnetic path which is enclosed by the winding 38. The currents in the other channel selection windings 39, 40, 41 are equal to zero. The flux produced by the channel selection winding 38 will also partially saturate that portion of the third magnetic path lying between the channel selection opening 25 and the air gap opening 17. The information which is to be transferred to the magnetic surface is applied in the form of a current to the write winding 37 which produces a flux in the first magnetic path. The relative sizes of the magnetic paths, the relative sizes of the windings and the relative magnitudes of the currents are selected so that the selected channel portion of the third magnetic path will be saturated by the combination of fluxes from the channel selection winding and the write winding, thereby causing a portion of the flux due to the write winding to pass across the air gap 13 and be recorded at the magnetic surface in the conventional manner. Since there is no flux in those portions of the second and third magnetic paths associated with the remaining channel selection windings, the flux due to the write winding current will not be forced across the air gaps 14, 15 and 16. This magnetic head may be used in the same manner for reading information previously stored on the magnetic surface by energizing a particular channel selection winding and noting changes in voltage occurring at the write winding as the stored information passes the corresponding air gap.

In the construction of the magnetic head of the invention, the cross sectional area of the third magnetic path should be greater than the cross sectional area of the second magnetic path so that an energized channel selection winding will not by itself saturate the third magnetic path. However, the cross sectional area of the third magnetic path should be less than the sum of the cross sectional areas of the first and second magnetic paths so that the combination of fluxes due to an energized channel selection winding and an energized write winding will saturate the third magnetic path, thereby forcing some flux to pass across the associated air gap. Further, the cross sectional area of the first magnetic path should be less than the sum of the cross sectional areas of the second and third paths so that the head will write at an air gap only when the associated channel selection winding is energized.

Thus it is seen that the magnetic head of the invention may be used to transfer information to or from one of a group of channels on a magnetic surface by merely energizing a particular channel selection winding without requiring mechanical movement of the head or requiring switching of the write circuit. In the construction of the magnetic head, it is preferred to make the channel selection windings with a relatively large number of turns so that a relatively small current may be used to select channels. This permits the use of a low current output channel switching circuit and the channel selection currents can be derived directly from conventional flip-flop circuits and associated diode gating systems. In contrast, the write winding may have a relatively few turns requiring a relatively high write current but providing low inductance and correspondingly fast recovery or writing time. The larger writing current required does not present a problem, since there is no switching of the write current. It should be noted that the magnetic head of the invention can be used to write simultaneously on two or more channels if desired by merely energizing two or more of the channel selection windings. While the embodiment of the invention shown in Fig. 1 is provided with four air gaps for writing on one or more of four channels, it is understood that the invention is not restricted to four channels but any number of channels may be utilized.

An alternative form of the invention is shown in Fig. 2 wherein a separate block of magnetic material is provided for each channel on the magnetic surface 12. In Fig. 2, elements corresponding to elements of Fig. 1 are identified by the same reference numerals. A plurality of blocks 46, 47, 48, 49 of magnetic material are joined together by mounting arms 50 and are positioned in predetermined relationship adjacent the magnetic surface 12.

In the embodiment illustrated, each of the blocks is made in the form of a cylindrical disc with a segment removed, the blocks respectively having first openings 51, 52, 53, 54 and second openings 55, 56, 57, 58 therein with air gaps 13, 14, 15, 16 and associated air gap openings 17, 18, 19, 20. The openings are disposed to provide a first magnetic path, indicated by the arrow 30, adjacent the first openings, a second magnetic path, indicated by the arrow 31, between the first and second openings, and a third magnetic path, indicated by the arrow 32, between the second openings and the air gap openings. Channel selection windings 38, 39, 40, 41 are passed through the corresponding first openings 51, 52, 53, 54 to provide a flux in the first magnetic path when energized. A write or signal winding 63 is passed through the corresponding first and second openings to provide a flux in the second magnetic path, the write winding being connected in series through each of the blocks 46, 47, 48, 49.

The magnetic head of Fig. 2 is operated in the same manner as the magnetic head of Fig. 1 and, as stated previously, it is preferred to have corresponding elements of the same size so that the magnetic head and the associated circuitry can be symmetrical for all channels. As was the case with the structure of Fig. 1, the cross sectional area of the third magnetic path should be greater than that of the second magnetic path but less than the sum of the cross sectional areas of the first and second paths and the cross sectional area of the first path should be less than the sum of those of the second and third paths. Where the magnitude of a cross sectional area of a path varies along the path, as in the embodiment of Fig. 2, the smallest area is the controlling factor in saturation considerations. Therefore, the magnitude of the least cross sectional area along a path is the value used in meeting the relationships set out above. It should further be noted that the positions of the write and channel selection windings can be interchanged on each of the blocks of the structure of Fig. 2 if desired without changing the operation of the invention.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a magnetic head for transferring information to and from a magnetic surface having a plurality of channels thereon, the combination of: a structure of magnetic material providing a plurality of air gaps for magnetic writing at the magnetic surface, said structure including means defining a first magnetic path adjacent each of said air gaps, and means defining a second magnetic path spaced from said first magnetic path, with said first and second paths disposed in parallel and with corresponding ends thereof connected across a third magnetic path; and a plurality of windings positioned about each of said second and third paths respectively.

2. In a magnetic head for transferring information to and from a magnetic surface having a plurality of channels thereon, the combination of: a structure of magnetic material providing a plurality of air gaps for magnetic writing at the magnetic surface, with a relatively low reluctance path across each of said air gaps adjacent the surface and a relatively high reluctance path across each of said air gaps remote from the surface, said structure including means defining a first magnetic path adjacent each of said air gaps, said first path having a least cross sectional area A3, and means defining a second magnetic path spaced from said first magnetic path, said second path having a least cross sectional area A2, with said first and second magnetic paths disposed in parallel and connected across a third magnetic path, said third path having a least cross sectional area A1, with A3 being greater than A2 but less than the sum of A1 and A2, and with A1 being less than the sum of A2 and A3; and a plurality of windings positioned about each of said second and third magnetic paths respectively.

3. In a magnetic head for transferring information to and from a magnetic surface having a plurality of channels thereon, the combination of: a structure of magnetic material providing a plurality of air gaps closely adjoining the magnetic surface adjacent the respective channels thereof, there being a magnetic circuit through said structure back of said air gaps; a signal winding sending a signal flux through said magnetic circuit; and means for locally saturating said magnetic circuit behind a selected one of said air gaps to transfer said signal flux to such air gap during such saturation.

4. In a magnetic head for transferring information to and from a magnetic surface having a plurality of channels thereon, the combination of: a block of magnetic material having an edge for positioning adjacent the magnetic surface; a plurality of air gaps in said edge providing for magnetic writing thereacross at the magnetic surface; a plurality of channel selection openings in said block; a signal opening in said block; a plurality of channel selection windings, one of said channel selection windings passing through each of said channel selection openings respectively; means for connecting each of said channel selection windings to a channel selection circuit; a signal winding passing through said signal openings; and means for connecting said signal winding to a signal circuit.

5. In a magnetic head for transferring information to and from a magnetic surface having a plurality of channels thereon, the combination of: a block of magnetic material having an edge for positioning adjacent the magnetic surface; a plurality of air gaps in said edge providing for magnetic writing thereacross at the magnetic surface; a signal opening in said block; a plurality of channel selection openings in said block disposed between said signal opening and said edge; a signal winding passing through said signal opening; means for connecting said signal winding to a signal circuit; a plurality of channel selection windings, one of said channel selection windings passing through said signal opening and each of said channel selection openings respectively; and means for connecting each of said channel selection windings to a channel selection circuit.

6. In a magnetic head for transferring information to and from a magnetic surface having a plurality of channels thereon, the combination of: a block of magnetic material having an edge for positioning adjacent the magnetic surface; a plurality of air gaps in said edge providing for magnetic writing thereacross at the magnetic surface; a signal opening in said block; a plurality of channel selection openings in said block disposed between said signal opening and said edge; a signal winding passing through said signal opening and having a relatively small number of turns; means for connecting said signal winding to a signal circuit; a plurality of channel selection windings, one of said channel selection windings passing through said signal opening and each of said channel selection openings respectively, each channel selection winding having a relatively large number of turns; and means for connecting each of said channel selection windings to a channel selection circuit.

7. In a magnetic head for transferring information to and from a magnetic surface having a plurality of channels thereon, the combination of: a block of magnetic material having an edge for positioning adjacent the magnetic surface; a plurality of air gap openings in said block adjacent said edge; a plurality of narrow air gaps communicating between said edge and each of said air gap openings respectively, providing for magnetic writing at the air gap on the magnetic surface; a signal opening in said block defining a first magnetic path; a plurality of channel selection openings in said block disposed between said signal opening and each of said air gap openings respectively and defining a second magnetic path between said signal opening and said channel selection openings and a third magnetic path between said air gap openings and said channel selection openings; a signal winding disposed about said first magnetic path; and a plurality of channel selection windings disposed about said second magnetic path, one of said channel selection windings passing through each of said channel selection openings respectively.

8. In a magnetic head for transferring information to and from a magnetic surface having a plurality of channels thereon, the combination of: a block of magnetic material having an edge for positioning adjacent the magnetic surface; a plurality of air gap openings in said block adjacent said edge; a plurality of air gaps communicating between said edge and each of said air gap openings respectively, providing for magnetic writing at the air gap on the magnetic surface; a signal opening in said block defining a first magnetic path, said first path having a least cross sectional area A1; a plurality of channel selection openings in said block disposed between said signal opening and each of said air gap openings respectively and defining a second magnetic path between said signal opening and said channel selection openings and a third magnetic path between said air gap openings and said channel selection openings, said second path having a least cross sectional area A2 and said third path having a least cross sectional area A3, with A3 being greater than A2 but less than the sum of A1 and A2, and with A1 being less than the sum of A2 and A3; a signal winding disposed about said first magnetic path; and a plurality of channel selection windings disposed about said second magnetic path, one of said channel selection windings passing through each of said channel selection openings respectively.

9. A magnetic head as defined in claim 8 in which said channel selection openings are substantially equal in size and said air gap openings are substantially equal in size and in which said second magnetic path is substantially the same size adjacent each of said channel selection openings and said third magnetic path is substantially the same size adjacent each of said channel selection openings.

10. In a magnetic head for transferring information to and from a magnetic surface having a plurality of channels thereon, the combination of: a plurality of blocks of magnetic material, each of said blocks having an air gap in an edge thereof for magnetic writing across the air gap at the magnetic surface, each of said blocks having first and second openings therethrough; means for mounting said blocks to dispose said air gaps in predetermined relationship adjacent the magnetic surface; a plurality of first windings, one of said first windings passing through each of said first openings respectively; a plurality of second windings, one of said second windings passing through each of said first and second openings respectively; means for connecting one of said pluralities of windings to a selection circuit; and means for connecting the other of said pluralities of windings to a signal circuit.

11. In a magnetic head for transferring information to and from a magnetic surface having a plurality of channels thereon, the combination of: a plurality of blocks of magnetic material, each of said blocks having an air gap in an edge thereof for magnetic writing across the air gap at the magnetic surface, each of said blocks having a first opening defining a first magnetic path, and a second opening defining a second magnetic path between said first and second openings and a third magnetic path between said air gap and said second opening; means for mounting said blocks to dispose said air gaps in predetermined relationship adjacent the magnetic surface; a plurality of first windings, one of said first windings being disposed about each of said first paths respectively; a plurality of second windings, one of said second windings being disposed about each of said second paths respectively; means for connecting one of said pluralities of windings to a selection circuit; and means for connecting the other of said pluralities of windings to a signal circuit.

12. In a magnetic head for transferring information to and from a magnetic surface having a plurality of channels thereon, the combination of: a plurality of blocks of magnetic material, each of said blocks having an air gap in an edge thereof for magnetic writing across the air gap at the magnetic surface, each of said blocks having a first opening defining a first magnetic path, and a second opening located between said first opening and said air gap defining a second magnetic path between said first and second openings and a third magnetic path between said air gap and said second opening; means for mounting said blocks to dispose said air gaps in predetermined relationship adjacent the magnetic surface; a plurality of first windings, one of said first windings being disposed about each of said first paths respectively, each of said first windings having a relatively large number of turns; a plurality of second windings, one of said second windings being disposed about each of said second paths respectively, each of said second windings having a relatively small number of turns; means for connecting each of said first windings to a channel selection circuit; and means for connecting said second windings in series to a signal circuit.

13. In a magnetic head for transferring information to and from a magnetic surface having a plurality of channels thereon, the combination of: a plurality of blocks of magnetic material, each of said blocks having an air gap in an edge thereof for magnetic writing across the air gap at the magnetic surface, each of said blocks having a first opening defining a first magnetic path, and a second opening located between said first opening and said air gap defining a second magnetic path between said first and second openings and a third magnetic path between said air gap and said second opening; means for mounting said blocks to dispose said air gaps in predetermined relationship adjacent the magnetic surface; a plurality of first windings, one of said first windings being disposed about each of said first paths respectively, each of said first windings having a relatively small number of turns; a plurality of second windings, one of said second windings being disposed about each of said second paths respectively, each of said second windings having a relatively large number of turns; means for connecting said first windings in series to a signal circuit; and means for connecting each of said second windings to a channel selection circuit.

14. In a magnetic head for transferring information to and from a magnetic surface having a plurality of channels thereon, the combination of: a plurality of blocks of magnetic material, each of said blocks having an air gap in an edge thereof for magnetic writing across the air gap at the magnetic surface, each of said blocks having a first opening defining a first magnetic path, and a second opening defining a second magnetic path between said first and second openings and a third magnetic path between said air gap and said second opening, said first path having a least cross sectional area A1, said second path having a least cross sectional area A2, and said third path having a least cross sectional area A3, with A3 being greater than A2 but less than sum of A1 and A2, and with A1 being less than the sum of A2 and A3; means for mounting said blocks to dispose said air gaps in predetermined relationship adjacent the magnetic surface; a plurality of first windings, one of said first windings passing through each of said first openings respectively; a plurality of second windings, one of said second windings passing through each of said first and second openings respectively; means for connecting one of said pluralities of windings to a selection circuit; and means for connecting the other of said pluralities of windings to a signal circuit.

References Cited in the file of this patent

UNITED STATES PATENTS 2,740,110 Trimble ---------------- Mar. 27, 1956
2,830,130 Greenwood ------------- Apr. 8, 1958